US006885010B1

(12) United States Patent
Traynor et al.

(10) Patent No.: US 6,885,010 B1
(45) Date of Patent: Apr. 26, 2005

(54) CARBON NANOTUBE ELECTRON IONIZATION SOURCES

(75) Inventors: Peter John Traynor, Scottsdale, AZ (US); Robert George Wright, Helsby (GB)

(73) Assignee: Thermo Electron Corporation, Waltham, MA (US)

( * ) Notice: Subject to any disclaimer, the term of this patent is extended or adjusted under 35 U.S.C. 154(b) by 0 days.

(21) Appl. No.: 10/706,329

(22) Filed: Nov. 12, 2003

(51) Int. Cl.[7] .................. H01J 37/073; H01J 37/08; H01J 1/05; H01J 1/14; D01F 9/12
(52) U.S. Cl. .................. 250/427; 250/423 R; 313/309; 313/311; 313/346 R
(58) Field of Search .................... 250/427, 423 R; 313/309, 311, 346 R (56) References Cited

U.S. PATENT DOCUMENTS

| 5,543,625 | A | | 8/1996 | Johnson et al. ............. 250/427 |
| 5,852,295 | A | | 12/1998 | Da Silveira et al. ..... 250/423 R |
| 6,080,985 | A | | 6/2000 | Welkie et al. .............. 250/287 |
| 6,232,706 | B1 | * | 5/2001 | Dai et al. ................... 313/309 |
| 6,333,016 | B1 | | 12/2001 | Resasco et al. .......... 423/447.3 |
| 6,495,116 | B1 | * | 12/2002 | Herman ................... 423/447.3 |
| 2001/0019238 | A1 | * | 9/2001 | Dai et al. ................... 313/309 |
| 2003/0090190 | A1 | * | 5/2003 | Takai et al. ................. 313/311 |

OTHER PUBLICATIONS

M. E. Read, et al., "Carbon Nanotube–Based Cathodes for Microwave Tubes", IEEE Proceedings of the 2001 Particle Accelerator Conference, Chicago, Illinois, Jun. 18–22, 2001, pp. 1026–1028.

* cited by examiner

*Primary Examiner*—Nikita Wells
(74) *Attorney, Agent, or Firm*—Osha & May, L.L.P.

(57) ABSTRACT

An ion source for use in a mass spectrometer includes an electron emitter assembly configured to emit electron beams, wherein the electron emitter assembly comprises carbon nanotube bundles fixed to a substrate for emitting the electron beams, a first control grid configured to control emission of the electron beams, and a second control grid configured to control energies of the electron beams; an ionization chamber having an electron-beam inlet to allow the electron beams to enter the ionization chamber, a sample inlet for sample introduction, and an ion-beam outlet to provide an exit for ionized sample molecules; an electron lens disposed between the electron emitter assembly and the ionization chamber to focus the electron beams; and at least one electrode disposed proximate the ion-beam outlet to focus the ionized sample molecules exiting the ionization chamber.

25 Claims, 5 Drawing Sheets

CNT EMITTER ASSEMBLY

FIG. 1 (A) VIEW IN XZ PLANE
PRIOR ART

FIG. 1 (B) VIEW IN XY PLANE
PRIOR ART

FIG. 2 (B) CNT EMITTER ASSEMBLY

FIG. 2 (A) CLOSED-END MWCNT

FIG. 3 (A) VIEW IN XZ PLANE

FIG. 3 (B) VIEW IN XY PLANE

FIG. 5

CARBON NANOTUBE ELECTRON IONIZATION SOURCES

CROSS-REFERENCE TO RELATED APPLICATIONS

Not Applicable.

BACKGROUND OF INVENTION

1. Field of the Invention

The invention relates generally to ion sources for mass spectrometers, and, more particularly, to carbon nanotube-based ion sources for mass spectrometers.

2. Background Art

Mass spectrometers are powerful instruments for the analysis of a wide variety of samples. In order to perform mass analysis, the samples need to be vaporized. The gas molecules are then ionized by an ion source. An efficient ion source will convert as many sample molecules into ions as possible and produce an optimal beam for the specific type of analyzer. The most common ion source is the electron ionization (EI) source. In an EI source, electrons are produced by thermal emission from a hot filament, which is heated by a current flowing through it, located outside the ionization chamber. The electrons are accelerated by an electric field to a desired level of energy. This energy level is typically round 70 eV, but can vary from about 10 eV to upwards of 150 eV, as defined by the potential difference between the filament and the ionization chamber. When the electrons collide with sample gas molecules in the ionization chamber, the gas molecules each lose an electron and become positively charged. Once the sample molecules acquire positive charges, they can be accelerated out of the ionization chamber and guided into the entrance of the mass spectrometer by an applied electrostatic field.

Figure 1:
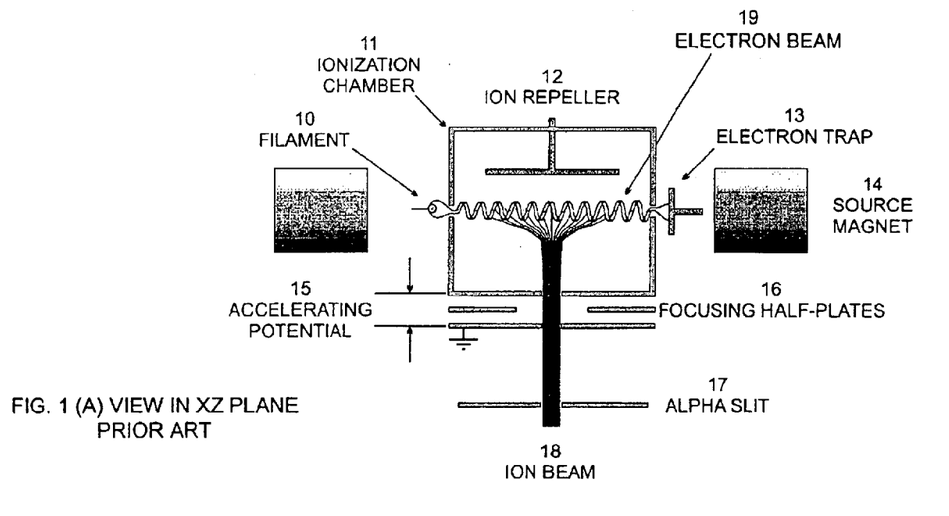
FIGS. 1A and 1B illustrate a conventional ion source based on Nier design.

While various configurations have been developed for EI sources used in mass spectrometers, the configuration originally design by Nier and the variants thereof are the most common. FIG. 1 shows two views of a basic Nier design ion source that uses a hot wire filament 10 to produce an electron beam 19; one view (1A) is perpendicular to the xz plane, while the other view (1B) is in the xy plane, where the x-axis is the direction of motion of ions leaving the ion source and the y-axis is in the direction of mass separation and the z-axis is perpendicular to both the x- and y-axes. The electron beam 19 is typically accelerated to about 70 eV of energy. The electron beam 19 is designed to interact with molecules introduced into the ionization chamber 11, under high vacuum. The interactions produce molecular ions and fragment ions that can be accelerated out of the ionization chamber 11.

Because the electron beam is somewhat divergent, a pair of permanent magnets 14 is added to force the electron beam 19 to travel in a spiral path, which constrains the motion of the electrons to a narrow beam. Any component of electron motion which is perpendicular to the magnetic flux acts to deflect the electrons into a spiral trajectory. This has the effect of increasing the probability of the interactions between the electron beam 19 and the molecules in the ionization chamber 11 in the region where they are extracted as positive ions. In this way good sensitivity and resolution (low ion energy spread) are achieved.

Once ionized, the newly charged particles are repelled by the ion repeller 12 to move towards an exit of the ionization chamber 11. In addition, the charged particles are accelerated by the accelerating potential 15, focused by the focusing half plate 16, and filtered by the alpha slit 17 to form a focused ion beam 18. The focused ion beam 18 is then introduced into a mass filter (not shown), where they are separated according to their mass-to-charge ratios.

Interactions between the sample gas and the hot filament may result in changes in the electron work function of the filament. In order to provide a constant intensity of the electron beam 19, an electron trap 13 is typically provided in an EI source. The electron trap 13 is to capture the proportion of the electron beam 19 that exits the ionization chamber 11. In addition, the electron trap 13 may also be used to monitor the intensity of the electron beam 19 in order to provide a feedback control to the current flowing through the filament 10. The feedback control enables the filament 10 to produce a constant intensity electron beam 19 as measured at the electron trap 13.

In a typical EI source, the filament 10 is a wire and made of a refractory metal. The current heats the filament 10 to a temperature (about 2000° C.) at which thermionic emission of electrons occurs. The filament 10 is typically held at a negative electric field relative to the ionization chamber 11 (e.g., by applying an potential difference across the filament 10 and the ionization 11) so that the emitted electrons are accelerated from the hot filament 10 in the direction of the gradient of the electric field. The translational energy of the electron beams affects the nature of the interactions between the gaseous sample molecules and the electrons.

Although a typical ion source design is based upon well established principles, the performance of an ion source depends upon the interactions of many subtle design characteristics. There are several problems associated with the filament assemblies used in electron impact or chemical ionization source. The primary problem is that the origin and trajectory of the electrons are ill defined. Additionally, the electron emission relies on the vaporization of material, which results in a limited filament lifetime. Interactions between the sample gas and the hot filament may result in changes in the electron work function of the filament. As noted above, a trap electrode (shown as 13 in FIG. 1) may be used in a feedback circuit to regulate the electron beam 19 intensity. However, regulation of the trap current will alter filament temperature. This can lead to fluctuation in the temperature distribution in the ion source and cause the assembly to become misaligned. These effects lead to changes in absolute sensitivity, relative sensitivity, and the degree of molecular fragmentation. As a result, it is often difficult, if not impossible, to de-convolute a mass spectrum of a complex mixture sample, due to inevitable uncertainties in the contributions from the components in the mixture.

Thus, to avoid mass analysis complications, it is desirable to have an ion source that can produce a stable stream of electrons with predictable trajectories and uniform density.

SUMMARY OF INVENTION

One aspect of the invention relates to ion sources for use in a mass spectrometer. An ion source in accordance with aspects of the invention includes an electron emitter assembly configured to emit electron beams, wherein the electron emitter assembly comprises carbon nanotube bundles fixed to a substrate for emitting the electron beams, a first control grid configured to control emission of the electron beams, and a second control grid configured to control energies of the electron beams; an ionization chamber having an electron-beam inlet to allow the electron beams to enter the ionization chamber, a sample inlet for sample introduction, and an ion-beam outlet to provide an exit for ionized sample molecules; an electron lens disposed between the electron emitter assembly and the ionization chamber to focus the electron beams; and at least one electrode disposed proximate the ion-beam outlet to focus the ionized sample molecules exiting the ionization chamber.

Another aspect of the invention relates to ion sources for use in a mass spectrometer, wherein the CNT emitter is incorporated within a micromachined ionization chamber. An ion source in accordance with embodiments of the invention includes an ionization chamber comprising carbon nanotube bundles for emitting electron beams, wherein the carbon nanotube bundles are fixed on a conductive surface on a first wall of the ionization chamber; a sample inlet disposed on the ionization chamber for sample introduction; an ion-beam outlet disposed on the ionization chamber to provide an exit for ionized sample molecules; and at least one electrode disposed proximate the ion-beam outlet to focus the ionized sample molecules exiting the ionization chamber, wherein the conductive surface on the first wall and an electron-energy plate on a second wall of the ionization chamber are adapted to connect to an electrical source such that an electrical field is established to induce electron beam emission from the carbon nanotube bundles.

One aspect of the invention relates to mass spectrometers. A mass spectrometer in accordance with embodiments of the invention includes a carbon nanotube-based ion source; a mass filter operatively coupled to the carbon nanotube-based ion source for separating ionized sample molecules based on their mass-to-charge ratios; and an ion detector operatively coupled to the mass filter for detecting the ionized sample molecules.

Other aspects and advantages of the invention will be apparent from the following description and the appended claims.

DETAILED DESCRIPTION

Embodiments of the present invention relate to ion sources for mass spectrometry. An ion source in accordance with embodiments of the invention is based on carbon nanotubes and can provide reliable electron beams for a long life time.

Figure 2:
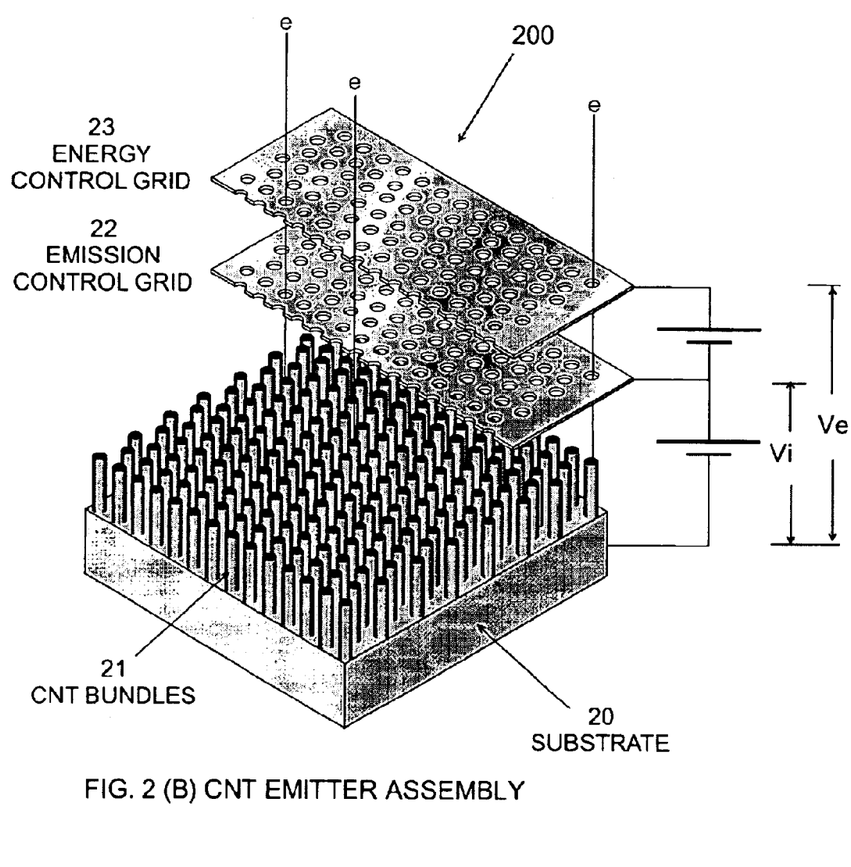
FIG. 2A illustrates a closed-end multi-walled carbon nanotube (MWCNT) and FIG. 2B illustrates the key components of the external CNT emitter assembly in accordance with one embodiment of the invention.

Carbon nanotubes (CNT) are seamless tubes of graphite sheets with full fullerene caps which were first discovered as multi-layer concentric tubes (i.e., multi-walled carbon nanotubes, MWCNT), as shown in FIG. 2A. Subsequently, single-walled carbon nanotubes (SWCNT) were prepared in the presence of transition metal catalysts. CNT have shown promising potentials in applications including nanoscale electronic devices, high strength materials, electron field emission, tips for scanning probe microscopy, gas storage, etc.

As electron field emitters, carbon nanotubes have the characteristics of low work function, durability, and thermal stability. Accordingly, an electron field emitter based on CNT can be driven at low voltage. In addition, the resistance of such devices to reactions with gases, which are generated during the operation of the device, is improved, thereby increasing the life span of the emitters. Examples of the use of CNT as electron field emitters and the methods of preparing CNT-based field emission arrays, for example, may be found in U.S. Pat. No. 6,440,761 issued to Choi.

Figure 3:
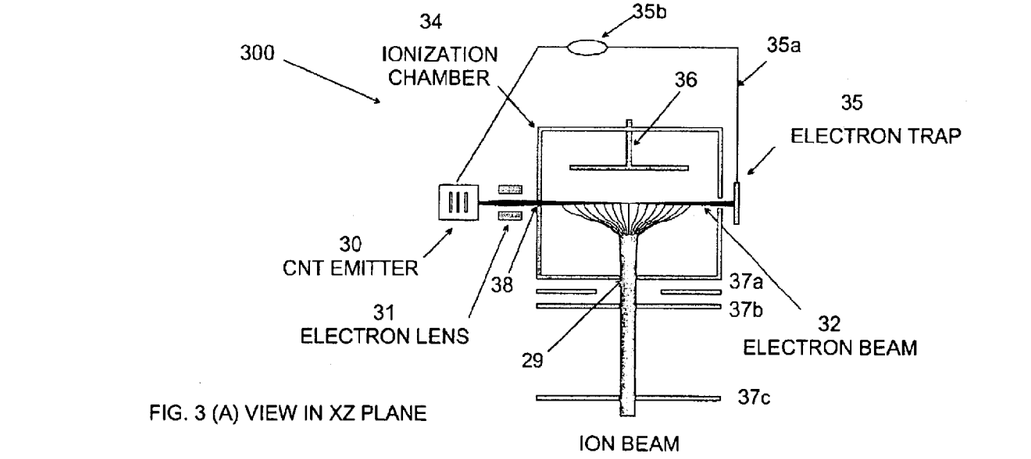
FIGS. 3A and 3B illustrate a carbon nanotube-based ion source in accordance with one embodiment of the invention.

FIG. 2B illustrates a CNT field emitter assembly 200 which consists of a substrate 20 with a conducting layer to which the parallel CNT bundles 21 are fixed. Immediately above, and insulated from, the ends of the CNT array is a first grid assembly (an emission control grid) 22 aligned in such a way as to provide the necessary field emission and to permit passage of the electrons through the second grid (an energy control grid) 23 that is connected to the energy controlling potential $V_e$. Electrons are ejected through the second grid 23 towards the ionization region (e.g., the ionization chamber 34 in FIG. 3A) having a current intensity controlled by the potential $V_i$. The potential $V_i$ controls the emission current density via a feedback circuit that incorporates the trap electrode (e.g., electron trap 35 in FIG. 3A). Potential $V_e$, is used to modify the electron energy, which is typically controlled at the 70 eV level. The CNT emitter assembly 200 thereby provides a monoenergetic electron beam of uniform density with a predetermined spatial origin and a fixed trajectory.

FIG. 3A shows a view in the XZ plane of an ion source 300 including a CNT emitter assembly 30 in accordance with one embodiment of the invention. This view illustrates the location of a CNT electron emitter assembly 30 and the electron lens 31 with respect to the ionization chamber 34 and the electron trap electrode 35. As shown, the CNT electron emitter assembly 30 is configured to produce an electron beam 32 via the field emission effect. The electron beam 32 is focused by the electron lens 32 into a narrow beam, which then passes the electron-beam inlet 38 into the ionization chamber 34. The electron beams 32 interacts with gas sample molecules in the ionization chambers 34 to produce ionized sample molecules. The ionized sample molecules may include molecule ions and fragment ions. The ionized sample molecules may be repelled by a repeller electrode 36 to exit the ionization chamber 34 via the ion-beam exit 29. The ionized sample molecules exiting the ionization chamber 34 are focused by at least one electrode/plate 37, which may include, for example, a focusing half plate 37a, a source slit plate 37b, and an alpha plate 37c, into a narrow ion beam 33. The ion bean 33 may then be introduced into a mass filter/analyzer (not shown) for analysis.

Also shown in FIG. 3A is an electron trap 35, which functions to capture the portion of the electron beam 32 that exit the ionization chamber 34. In some embodiments, the electron trap 35 may be coupled to a feedback circuit 35a and an electrical source 35b to regulate the emission of the electron beam 32 from the CNT electron emitter assembly 30. The electron trap 35 together with the feedback circuit 35a makes it possible to control the emission of the electron beam 32 at a constant level, as determined by the electron beams 32 captured by the electron trap 35.

FIG. 3B illustrates another view of the ion source 300 shown in FIG. 3A. As shown, the ionization chamber 34 includes a sample inlet 28 for the introduction of sample gas and an ion-beam outlet 29 to allowed the ionized sample molecules (i.e., ion beam 33) to exit the ionization chamber 34. At least one electrode/plate 37 is provided around the ion-beam outlet 29 to focus the exiting ion beam 33. The at least one electrode 37 may function to extract and focus the ionized sample molecules as an ion beam 33. The extraction of the ionized sample molecules may also be facilitated by the ion repeller 36 and an accelerating potential applied across the ionization chamber 34 and the source slit plate 37b. The at least one electrode 37, for example, may include a focusing half plate 37a, a source slit plate 37b, and an alpha slit 37c. Once out of the ionization chamber 34, the ion beam 33 may be focused by the focusing half plate 37a, the source slit plate 37b, and/or the alpha slit 37c, before the ion beam 33 is allowed into a mass filter/analyzer (not shown).

Figure 4:
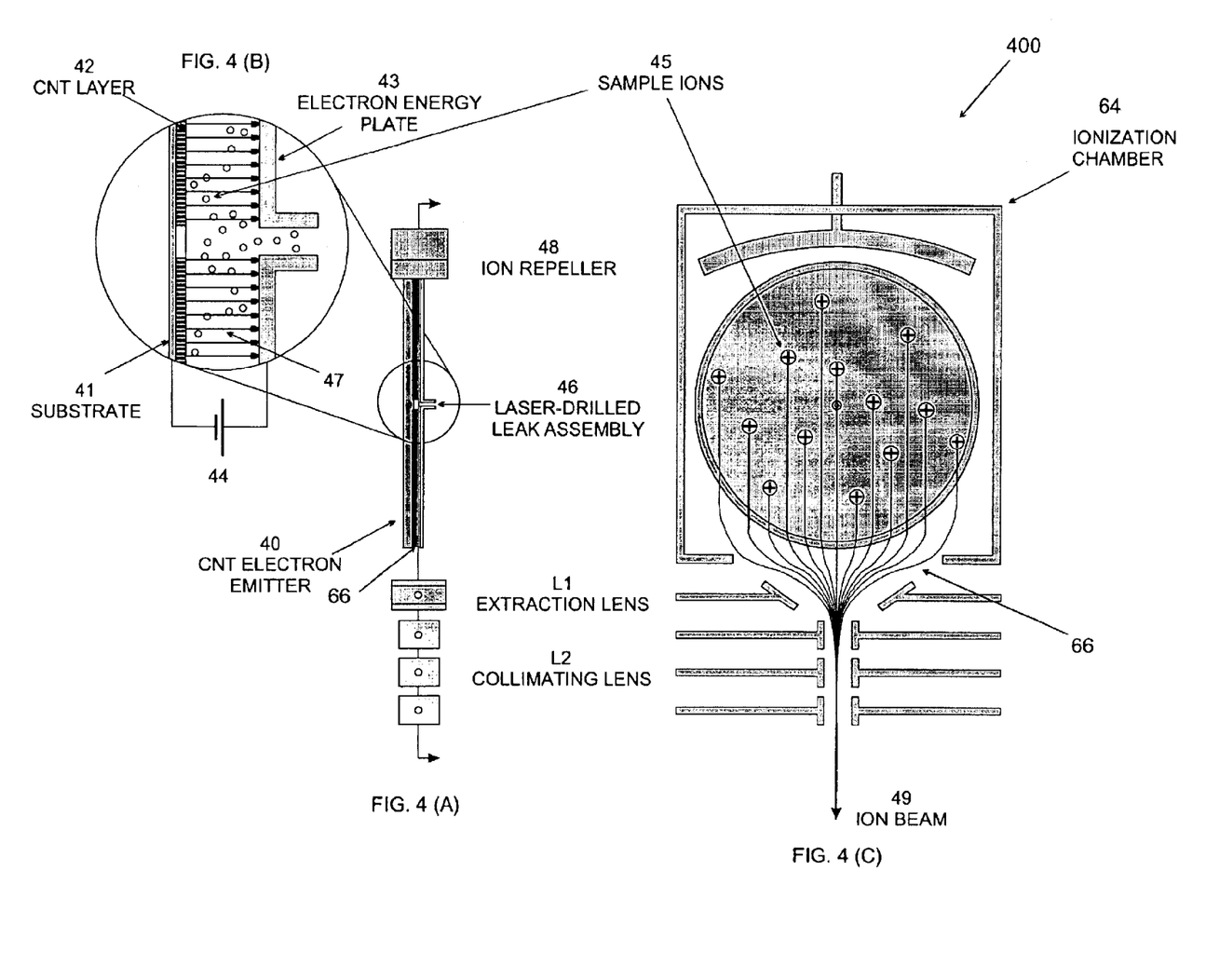
FIGS. 4A–4C illustrate a carbon nanotube-based ion source in accordance with another embodiment of the invention.

FIGS. 4A–4C show a CNT-based ion source in accordance with one embodiment of the invention. The CNT-based ion source 400 is particularly suitable for use in a miniature mass spectrometer. FIG. 4A shows a side view in the xz plane of the CNT-based ion source 400. FIG. 4B shows an enlarged section of a CNT electron emitter/ion source assembly 40 included in the ion source 400 shown in FIG. 4A, while FIG. 4C shows a view of the ion source 400 in the xy plane.

Referring to FIGS. 4A and 4B, the CNT electron emitter 40 comprises a substrate layer 41, on which a layer of carbon nanotubes 42 is formed. A preferred embodiment of the CNT electron emitter 40 for use in a miniaturized mass spectrometer, for example, may include a CNT array of approximately 0.1 cm$^2$ and will contain of the order of 10$^8$ MWCNTs. However, one of ordinary skill in the art would appreciate that other dimensions and densities of the CNT array may also be used without departing from the scope of the invention. There are three main approaches to the synthesis of CNT: laser ablation of carbon, electric arc discharge of graphite rod, and chemical vapor deposition (CVD) of hydrocarbons, as disclosed in U.S. Pat. No. 6,333,016 B1 issued to Resasco et al. and references cited therein. Among these approaches, CVD coupled with photolithography has been found to be the most versatile in the preparation of various CNT devices. Many commercial sources now supply high quality CNT devices in various configurations. The CNT suitable for use with embodiments of the invention, for example, may be obtained from Molecular Nanosystems (Palo Alto, Calif.).

The layer of carbon nanotubes 42 may comprise a highly ordered array of defect-free, parallel carbon nanotubes (CNT). These can be single-walled (SWCNT), multi-walled (MWCNT) CNT, or a combination thereof. Both MWCNT and SWCNT can be manufactured to have narrow size distributions, large-scale periodicities, and high array densities. These attributes result in a very stable, predictable, and uniformly dense electron beam. In preferred embodiments of the invention, the carbon nanotube layer 42 comprise MWCNT.

When an electrical source 44 (for generating an electric field) is applied across the layer of substrate 41 and the electron energy plate 43 of the ionization chamber 64, electrons emitted from the CNT layer 42 are accelerated towards the electron energy layer 43. As in a conventional EI source, this electric field 44 may be controlled to provide the electron beams with a desired energy level to cause fragmentation of the molecules. In a typical application this electric field may be maintained at between 10 and 150 eV. In preferred embodiments of the invention, this field is maintained to provide the electron beams with an energy equivalent to about 70 eV.

In operation, the sample in gaseous state is introduced into the ionization chamber 64 (see FIG. 4B or 4C) via a sample inlet 46. The sample inlet 46 may be a laser drilled leak assembly or any suitable machined opening. Once inside the ionization chamber 64, the sample molecules 45 interact with the electron beams 47 emitted by the CNT layer 42. As a result of the interactions, the sample molecule 45 become ionized (charged). The ionized sample molecules 45 may then be repelled by the ion repeller 48, which comprise an electrode disposed inside the ionization chamber 64, to move towards an ion-beam outlet 66. An extraction lens L1 is provided near the outlet. The extraction lens L1, which comprise one or more electrodes, is provided with an electrical potential to help the charged molecules 45 move out of the ion-beam outlet 66. Once the charged molecules 45 exit the ionization chamber 64, they are focused by a series of collimating lens L2, which comprises at least one electrode, to form a highly focused molecular ion beam 49, which is then introduced into the mass filter (mass analyzer) portion of a mass spectrometer (not shown) that separates and detects these charged ions 45 based on their mass-to-charge ratios (m/z).

Figure 5:
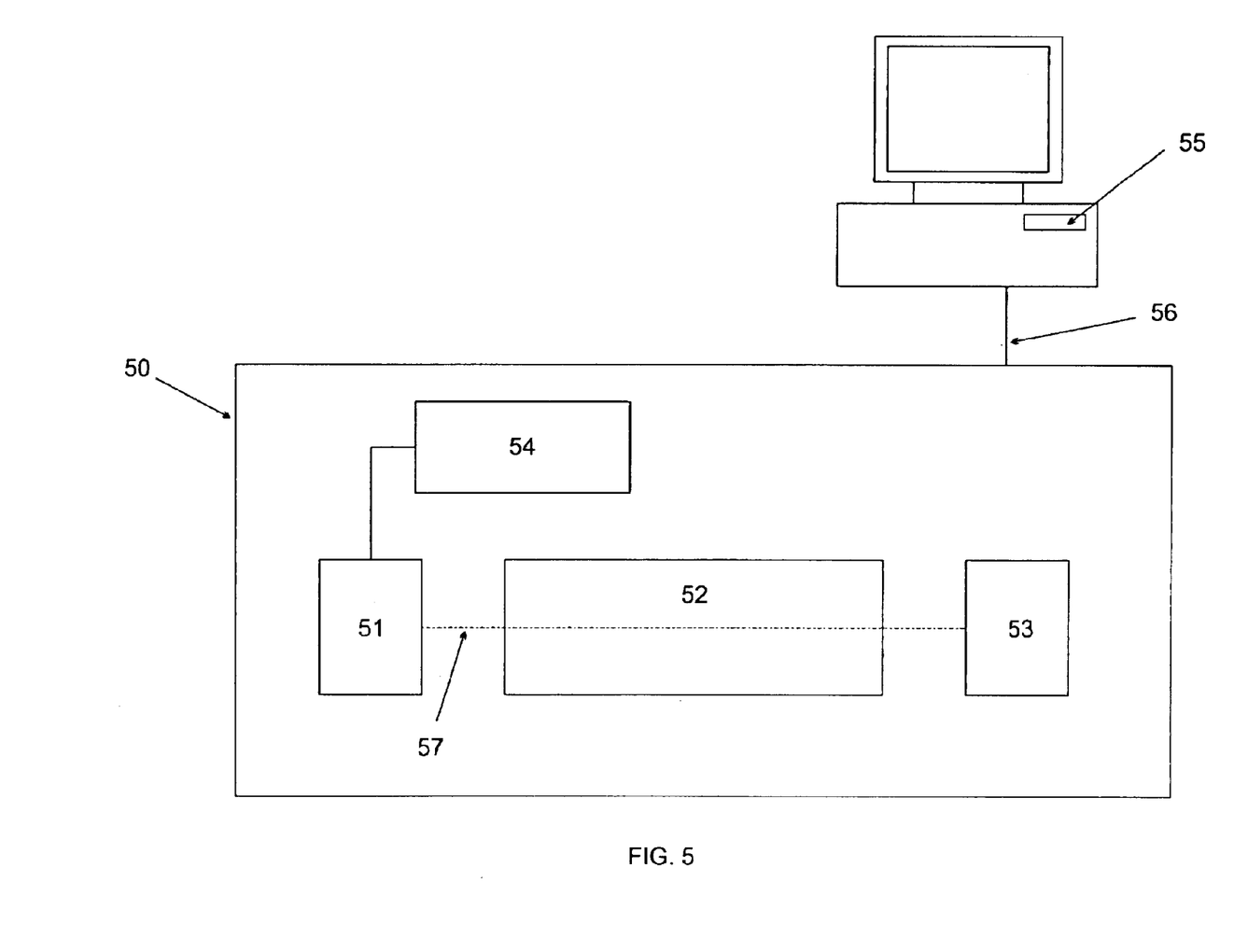
FIG. 5 shows a schematic of a mass spectrometer in accordance with one embodiment of the invention.

FIG. 5 shows a schematic of a mass spectrometer using a CNT based ion source (see FIG. 3 and FIG. 4) in accordance with one embodiment of the invention. As shown, a mass spectrometer 50 comprises an ion source 51, a mass filter 52, and a detector 53. The ion source 51 may comprise a CNT-based ion source shown in either FIG. 3 or FIG. 4. The ion source 51 ionize sample molecules and focuses them into a narrow ion beam 57 (see also FIGS. 3 and 4).

The narrow ion beam 57 is introduced into the mass filter 52, where the charged particles are separated according to their m/z. Embodiments of the invention may use any mass filter known in the art. These mass filters may be based on, for example, magnetic sector, electrostatic sector, quadrupole, ion trap, time-of-flight, etc. The separated charge particles are then detected by ion detector 53. Again, any suitable ion detector may be used with embodiments of the invention.

In addition, the mass spectrometer 50 includes an electronic module 54 that can control the entry of the ion beam 57 into the mass filter 52. The electronic module 54 may accomplish this function by two mechanisms: by controlling the production of electron beams (shown as 47 in FIG. 4) from the CNT layer (shown as 42 in FIG. 4) or by controlling the introduction of the ion beam 57 into the mass filter 52. In preferred embodiments of the invention, the electronic module 54 controls the generation of the electron beams from the CNT layer (see FIG. 3 and FIG. 4). The advantage of blocking the electron beam formation from the CNT layer, as opposed to blocking the entry of the molecular ion beam 57 into the mass filter 52, is that much smaller transition times are needed for blocking the electron beam, as compared to blocking the ion beam, all other factors being equal. This is due to the fact that the molecular ions are at least 10,000 times more massive than the electrons, and, therefore, electrons travel at least 100 times faster than ions at comparable energies. Consequently, transition times in the stopping and starting of electron beams are at least 100 times faster than for ion beams.

In addition, a CNT-based electron emitter in accordance with embodiments of the invention permits fast switching (i.e., turning on and off at high frequency), which makes pulsed ionization possible. For example, referring to FIG. 3A and FIG. 4B, alternately switching on the electron beams 47 and the ion repeller 48 allows the source designer to select a relatively high repeller 48 voltage that can be used to ensure rapid ion extraction, without distorting the electron beam 47 energy or trajectory.

Referring again to FIG. 5, the mass spectrometer 50 may be controlled by a computer 55. The computer 55 may be a general purpose computer or specifically designed computer that may include interfaces 56 and programs to control sample ionization by the ion source 51, the operation of the mass filter 52 (e.g., ramping the electrostatic field or the magnetic field), and the detection of the charged molecules by the ion detector 53. In addition, the computer 55 also controls the electronic module 54 that, for example, may permit pulsed ionization or alternate switching on the ion source and the repeller potential, as noted above. In alternative embodiments of the invention, the electronic modules may be part of the computer 55, rather than part of the mass spectrometer 50.

The above examples are for illustration only. One of ordinary skill in the art would appreciate that various modifications are possible without departing from the scope of the invention. For example, while the ion source shown in FIG. 4 has a generally square (box) shaped ionization chamber 64 and a disk-shaped CNT layer, other geometries may also be used.

The advantages of the invention may include one or more of the following. In designing an ion source in accordance with embodiments of the invention, a computer program may be used to simulate the ion trajectory and reduce the number of variables associated with the performance characteristics of the ion source. The same program can also be used to model and monitor changes in the performance of the CNT-based ion source, once it is in service. The ability to monitor and account for changes in the performance of the ion source in turn allows for easy calibration of the instruments, for example, using application gas library with software correction provided by measuring a single certified calibration gas blend. This would provide a significant reduction in the complexity of operation, as compared to a traditional EI equipped mass spectrometer.

Because the CNT-based ion source design removes the need for regular filament replacement, it is possible to design an extremely capable and reliable general-purpose industrial gas analyzer with no moving parts. This is made possible because the traditional turbo molecular vacuum pump can be replaced with an ion pump because there is no longer a requirement for a fast pump-down time—the vacuum does not need to be interrupted for routine maintenance. The CNT-based ion sources in accordance with the invention can be operated with minimal thermal perturbation and can respond to fast voltage regulation. This makes it possible to run the mass analysis in a pulsed mode.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An ion source for use in a mass spectrometer, comprising:
    an electron emitter assembly configured to emit electron beams, wherein the electron emitter assembly comprises carbon nanotube bundles fixed to a substrate for emitting the electron beams, a first control grid configured to control emission of the electron beams, and a second control grid configured to control energies of the electron beams;
    an ionization chamber having an electron-beam inlet to allow the electron beams to enter the ionization chamber, a sample inlet for sample introduction, and an ion-beam outlet to provide an exit for ionized sample molecules;
    an electron lens disposed between the electron emitter assembly and the ionization chamber to focus the electron beams; and
    at least one electrode disposed proximate the ion-beam outlet to focus the ionized sample molecules exiting the ionization chamber.

2. The ion source of claim 1, wherein the carbon nanotube bundles comprise one selected from single-walled carbon nanotubes, multi-walled carbon nanotubes, and a combination thereof.

3. The ion source of claim 1, further comprising an ion repeller disposed inside the ionization chamber to help the ionized sample molecules exit the ionization chamber.

4. The ion source of claim 1, further comprising a trap electrode to capture a portion of the electron beams exiting the ionization chamber to provide a feedback control of electron beam emission.

5. The ion source of claim 1, wherein the at least one electrode comprises at least one selected from a focusing half plate, a source slit plate, an alpha plate, an extracting lens, and a collimating lens.

6. The ion source of claim 1, wherein the second control grid are adapted to connect to an electrical source such that the energies of the electron beams are about 70 electron volts.

7. An ion source for use in a mass spectrometer, comprising:
    an ionization chamber comprising carbon nanotube bundles for emitting electron beams, wherein the carbon nanotube bundles are fixed on a conductive surface on a first wall of the ionization chamber;
    a sample inlet disposed on the ionization chamber for sample introduction;
    an ion-beam outlet disposed on the ionization chamber to provide an exit for ionized sample molecules; and
    at least one electrode disposed proximate the ion-beam outlet to focus the ionized sample molecules exiting the ionization chamber,
    wherein the conductive surface on the first wall and an electron-energy plate on a second wall of the ionization chamber are adapted to connect to an electrical source such that an electrical field is established to induce electron beam emission from the carbon nanotube bundles.

8. The ion source of claim 7, wherein the carbon nanotube bundles comprise one selected from single-walled carbon nanotubes, multi-walled carbon nanotubes, and a combination thereof.

9. The ion source of claim 7, further comprising an ion repeller disposed inside the ionization chamber to help the ionized sample molecules exit the ionization chamber.

10. The ion source of claim 7, wherein the at least one electrode comprises at least one selected from a focusing half plate, a source slit plate, an alpha plate, an extracting lens, and a collimating lens.

11. A mass spectrometer, comprising:
    a carbon nanotube-based ion source;
    an electron emitter assembly configured to emit electron beams, wherein the electron emitter assembly comprises carbon nanotube bundles fixed to a substrate for emitting the electron beams, a first control grid configured to control emission of the electron beams, and a second control grid configured to control energies of the electron beams, a mass filter operatively coupled to the carbon nanotube-based ion source for separating ionized sample molecules based on their mass-to-charge ratios; and an ion detector operatively coupled to the mass filter for detecting the ionized sample molecules.

12. The mass spectrometer of claim 11, wherein the carbon nanotube-based ion source comprises:

an ionization chamber having an electron-beam inlet to allow the electron beams to enter the ionization chamber, a sample inlet for sample introduction, and an ion-beam outlet to provide an exit for ionized sample molecules;

an electron lens disposed between the electron emitter assembly and the ionization chamber to focus the electron beams; and at least one electrode disposed proximate the ion-beam outlet to focus the ionized sample molecules exiting the ionization chamber.

13. The mass spectrometer of claim 12, wherein the carbon nanotube bundles comprise one selected from single-walled carbon nanotubes, multi-walled carbon nanotubes, and a combination thereof.

14. The mass spectrometer of claim 12, wherein the carbon nanotube-based ion source further comprising an ion repeller disposed inside the ionization chamber to help the ionized sample molecules exit the ionization chamber.

15. The mass spectrometer of claim 12, wherein the carbon nanotube-based ion source further comprising a trap electrode to capture a portion of the electron beams exiting the ionization chamber and to provide a feedback control of electron beam emission.

16. The mass spectrometer of claim 12, wherein the at least one electrode comprises at least one selected from a focusing half plate, a source slit plate, an alpha plate, an extracting lens, and a collimating lens.

17. The mass spectrometer of claim 12, wherein the second control grid are adapted to connect to an electrical source such that the energies of the electron beams are about 70 electron volts.

18. The mass spectrometer of claim 11, wherein the carbon nanotube-based ion source comprises:

an ionization chamber comprising carbon nanotube bundles for emitting electron beams, wherein the carbon nanotube bundles are fixed on a conductive surface on a first wall of the ionization chamber;

a sample inlet disposed on the ionization chamber for sample introduction;

an ion-beam outlet disposed on the ionization chamber to provide an exit for ionized sample molecules; and at least one electrode disposed proximate the ion-beam outlet to focus the ionized sample molecules exiting the ionization chamber, wherein the conductive surface on the first wall and an electron-energy plate on a second wall of the ionization chamber are adapted to connect to an electrical source such that an electrical field is established to induce electron beam emission from the carbon nanotube bundles.

19. The mass spectrometer of claim 18, wherein the carbon nanotube bundles comprise one selected from single-walled carbon nanotubes, multi-walled carbon nanotubes, and a combination thereof.

20. The mass spectrometer of claim 18, further comprising an ion repeller disposed inside the ionization chamber to help the ionized sample molecules exit the ionization chamber.

21. The mass spectrometer of claim 18, wherein the at least one electrode comprises at least one selected from a focusing half plate, a source slit plate, an alpha plate, an extracting lens, and a collimating lens.

22. The mass spectrometer of claim 11, wherein the mass filter is based on a mechanism selected from magnetic sector, electrostatic sector, quadrupole, ion trap, and time-of-flight.

23. The mass spectrometer of claim 11, further comprising an electronic module operatively coupled to the carbon nanotube-based ion source for controlling electron beam emission.

24. The mass spectrometer of claim 11, further comprising a computer operatively coupled to the mass spectrometer.

25. The mass spectrometer of claim 24, wherein the computer comprises a program for monitoring a performance of the ion source.

* * * * *